US010772398B2

(12) United States Patent
Stringham

(10) Patent No.: US 10,772,398 B2
(45) Date of Patent: Sep. 15, 2020

(54) WALKING STICK WITH INTEGRATED WATER FILTRATION

(71) Applicant: Kyle Cobb Stringham, Ogden, UT (US)

(72) Inventor: Kyle Cobb Stringham, Ogden, UT (US)

( * ) Notice: Subject to any disclaimer, the term of this patent is extended or adjusted under 35 U.S.C. 154(b) by 0 days.

(21) Appl. No.: 16/330,503

(22) PCT Filed: Sep. 8, 2017

(86) PCT No.: PCT/US2017/050819
§ 371 (c)(1),
(2) Date: Mar. 5, 2019

(87) PCT Pub. No.: WO2018/049258
PCT Pub. Date: Mar. 15, 2018

(65) Prior Publication Data
US 2019/0191833 A1    Jun. 27, 2019

Related U.S. Application Data

(60) Provisional application No. 62/385,766, filed on Sep. 9, 2016.

(51) Int. Cl.
*A45B 3/00* (2006.01)
*C02F 1/00* (2006.01)
*A63C 11/22* (2006.01)
*C02F 1/32* (2006.01)

(52) U.S. Cl.
CPC ................ *A45B 3/00* (2013.01); *A63C 11/22* (2013.01); *C02F 1/002* (2013.01); *C02F 1/32* (2013.01)

(58) Field of Classification Search
CPC .... A45B 3/00; A45B 9/00; A45B 9/02; A45B 9/04; A45B 2009/005; A45B 2009/007; A45B 2200/055; A61H 3/02; C02F 2209/03; C02F 2201/002; C02F 1/32;
(Continued)

(56) References Cited

U.S. PATENT DOCUMENTS 255,299 A  *  3/1882  Keam ...................... A45B 3/00
                                                        135/66
3,443,820 A  *  5/1969  Baker .................. A63C 11/222
                                                        280/816
(Continued)

*Primary Examiner* — Winnie Yip
(74) *Attorney, Agent, or Firm* — Sandy Lipkin

(57) ABSTRACT

An embodiment includes a walking stick. The walking stick includes a rod assembly, a water purification assembly, and a manual pump. The rod assembly extends from a first end to a second end that is opposite the first end along a longitudinal direction of the rod assembly. The rod assembly includes at least one rod portion. The water purification assembly is integrated with the rod assembly. The manual pump is configured to impose a pressure gradient in the water purification assembly. The manual pump includes a plunger that is physically coupled to a handle portion. Motion of the plunger relative to the water purification assembly draws water into an inlet tube that is positioned in the rod portion and through the water purification assembly. The motion of the plunger results from translation of the handle portion in substantially the longitudinal direction of the rod assembly.

18 Claims, 7 Drawing Sheets

(58) Field of Classification Search
CPC ...... C02F 1/002; A63C 11/221; A63C 11/228; A63C 11/22
USPC ................ 135/65–66, 72, 77; 280/816, 819; 206/216; 215/308
See application file for complete search history.

(56) References Cited

U.S. PATENT DOCUMENTS

| | | | | |
|---|---|---|---|---|
| 3,820,182 | A * | 6/1974 | Vockroth | A47L 13/00 15/1.7 |
| 4,229,015 | A * | 10/1980 | Ramsey | A63C 11/222 135/66 |
| 4,584,733 | A * | 4/1986 | Tietge | E04H 4/16 15/1.7 |
| 9,044,072 | B2 * | 6/2015 | Lindsay, Jr. | A45B 3/14 |
| 2002/0104560 | A1 * | 8/2002 | Kelley | A01K 97/06 135/66 |
| 2005/0211284 | A1 * | 9/2005 | Dooley | A45B 3/00 135/65 |
| 2011/0132419 | A1 * | 6/2011 | Forrester | A45B 3/14 135/66 |
| 2015/0374080 | A1 * | 12/2015 | Lindsay, Jr. | A45B 3/14 135/65 |

* cited by examiner

WALKING STICK WITH INTEGRATED WATER FILTRATION

RELATED APPLICATION

This application claims the benefit of and priority to U.S. Provisional Patent Application No. 62/385,766 filed Sep. 9, 2016, which is incorporated herein by reference in its entirety.

FIELD

The embodiments discussed in this disclosure are related to a walking stick with integrated to water filtration.

BACKGROUND

Obtaining drinkable or potable water when away from trustworthy public water sources can be problematic. For instance, while outdoors such as during hiking trips, individuals may carry potable water obtained from a trustworthy source. The individual may drink the water during the hike to maintain adequate levels of hydration. However, it is difficult to estimate an amount of water that is sufficient to maintain a healthy level of hydration. For instance, the temperature may be hotter than expected, which may increase consumption of the water. Moreover, water is heavy. Accordingly, carrying the water may introduce an additional load.

Additionally or alternatively, individuals may carry a portable water filtration system (filtration system). The filtration system may enable a user to draw water from naturally-occurring water source, such as a stream or lake, and to filter the water. However, filtrations systems are an extra piece of equipment that is often forgotten and poorly maintained. Moreover, through attempts to minimize the volume and weight of filtration systems, the functionality of some filtration systems has been reduced. For instance, use of some filtrations systems involves the user laying on her stomach and putting her face near the water source. Additionally, filtration systems are stored while walking, which may introduce additional steps in obtaining potable water and may reduce a number of times users hydrate.

The subject matter claimed herein is not limited to embodiments that solve any disadvantages or that operate only in environments such as those described above. Rather, this background is only provided to illustrate one example technology area where some embodiments described herein may be practiced.

SUMMARY

An aspect includes a walking stick that may include a rod assembly, water purification assembly, and a manual pump. The rod assembly may extend from a first end to a second end that is opposite the first end along a longitudinal direction of the rod assembly. The rod assembly may include at least one rod portion. A length of the rod assembly from the first end to the second end may be between about 48 inches and about 59 inches or another suitable length. The rod assembly may be comprised of aluminum, copper, steel, plastic, carbon fiber, wood or another suitable material. The water purification assembly may be integrated with the rod assembly. For example, an outer diameter of the water purification assembly is within about thirty-five percent of an outer diameter of the rod portion. The manual pump may be configured to impose a pressure gradient in the water purification assembly. The manual pump includes a plunger that may be physically coupled to a handle portion. Motion of the plunger relative to the water purification assembly draws water into an inlet tube that may be positioned in the rod portion and through the water purification assembly. The motion of the plunger results from translation of the handle portion in substantially the longitudinal direction of the rod assembly. The water purification assembly may include a filter inlet and a filter housing. The filter housing may define a filter volume configured to receive a filter device that is configured to remove at least a portion of contaminates from the water through imposition of the pressure gradient in the inlet tube and the filter volume. The walking stick may include a passage block that is positioned at one end of the filter housing. The passage block may defined a pump inlet tube, a pump outlet tube, and a translation volume. The pump inlet tube may extend from the filter volume to the translation volume. The pump outlet tube may extend from the translation volume to an outlet. The handle portion may include a collar that is configured to selectively attach to a portion of the passage block to place the manual pump in an active configuration and an inactive configuration. In the active configuration, the handle portion is disconnected from the passage block and capable of translation relative to the passage block. In the inactive position, the handle portion is connected to the passage block. The walking stick may comprise a bellows that may be included within a compartment of the handle portion. The walking stick may include a butterfly valve. The butterfly valve may be positioned at the inlet tube end between the pump inlet tube and the translation volume. The butterfly valve may be configured to enable the water to pass from the pump inlet tube to the translation volume and to prevent the water from passing from the translation volume to the pump inlet tube. The passage block may define a backflow passage that extends from the pump inlet tube to an external surface of the passage block. The walking stick may further comprise a backflow ring that may be configured to selectively seal the backflow passage. The backflow ring may be positioned on a portion of the outlet that extends from the external surface of the passage block. The rod assembly may defines one or more openings. The inlet tube and the filter volume may be fluidly coupled to the openings and the pressure gradient imposed by the manual pump draws the water in though the openings. The walking stick may comprise a rod tip that is located at the first end. The openings may be defined in the rod tip. Additionally, the walking stick may further comprise a rod tip and a basket. The openings may be defined between the basket and the water purification assembly. The walking stick may include an initial filter system that may be positioned between the openings and the inlet tube. The initial filter system may be configured to remove at least a second portion of contaminants from the water that include particulates that are greater in size that the portion of the contaminants that are removed from the water purification assembly. The walking stick may include a fluid spreader that is introduced into the inlet tube and positioned at the filter inlet. The fluid spreader may be configured to radially disperse the water into the filter volume. The rod assembly may include an upper portion that includes the manual pump, a lower portion that includes the first end, and a middle portion between the upper portion and the lower portion that includes at least a portion of the a water purification assembly.

The rod assembly may include two or more rod portions that are selectively secured relative to one another, and an adjustment collar configured to secure one the rod portions relative to the other rod portion. Loosening of the adjustment collar enables translation of one the rod portions relative to the other rod portion and tightening of the adjustment collar secures the one the rod portions relative to the other rod portion. The rod assembly is configurable in a collapsed arrangement in which the rod portions are translated relative to one another such that the length of the rod assembly is a shortest length.

The object and advantages of the embodiments will be realized and achieved at least by the elements, features, and combinations particularly pointed out in the claims. It is to be understood that both the foregoing general description and the following detailed description are exemplary and explanatory and are not restrictive of the invention, as claimed.

BRIEF DESCRIPTION OF THE DRAWINGS

Example embodiments will be described and explained with additional specificity and detail through the use of the accompanying drawings in which.

DESCRIPTION OF EMBODIMENTS

Figure 1A:
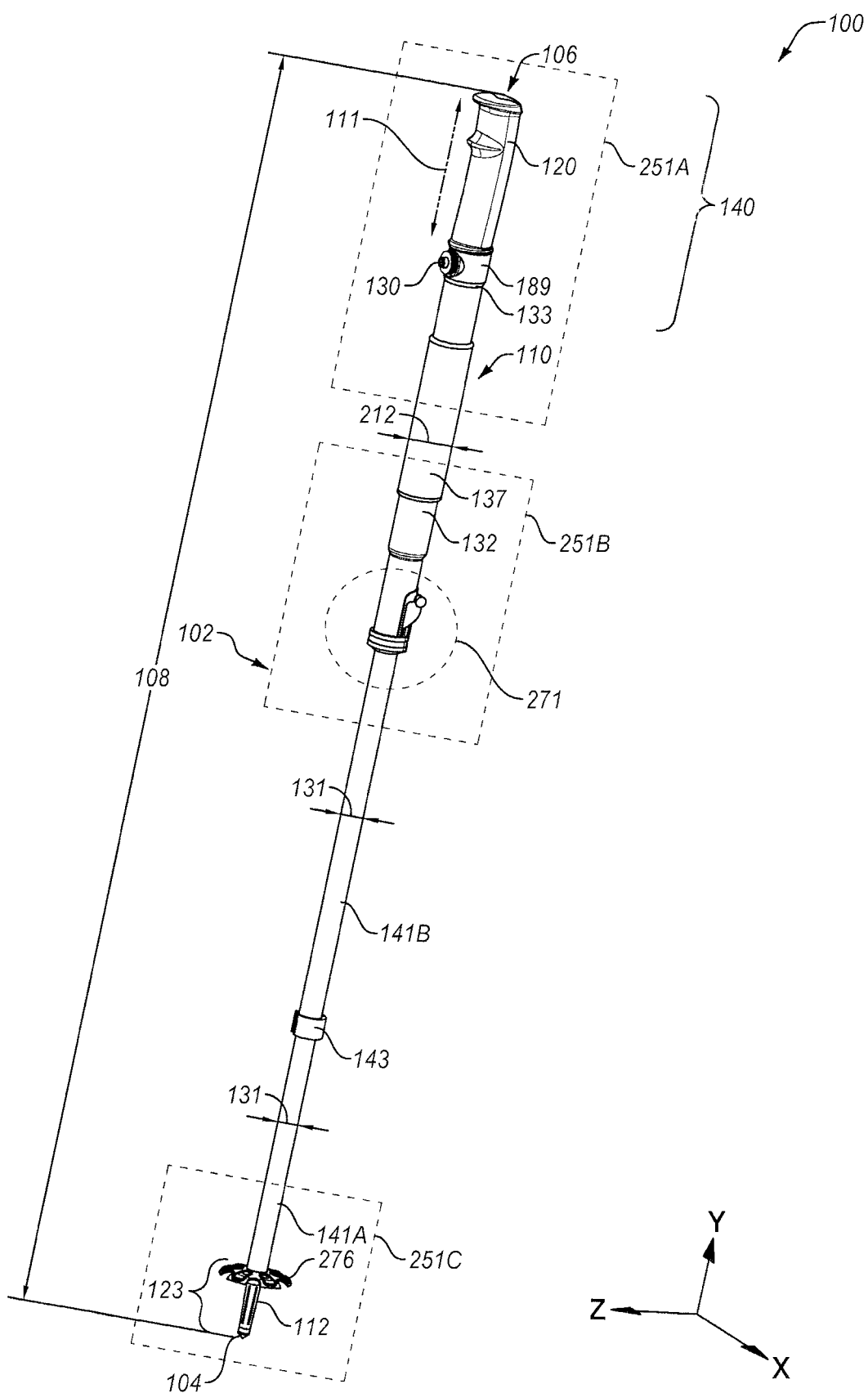
FIG. 1A is an example walking stick with integrated water filtration (walking stick)
Figure 1B:
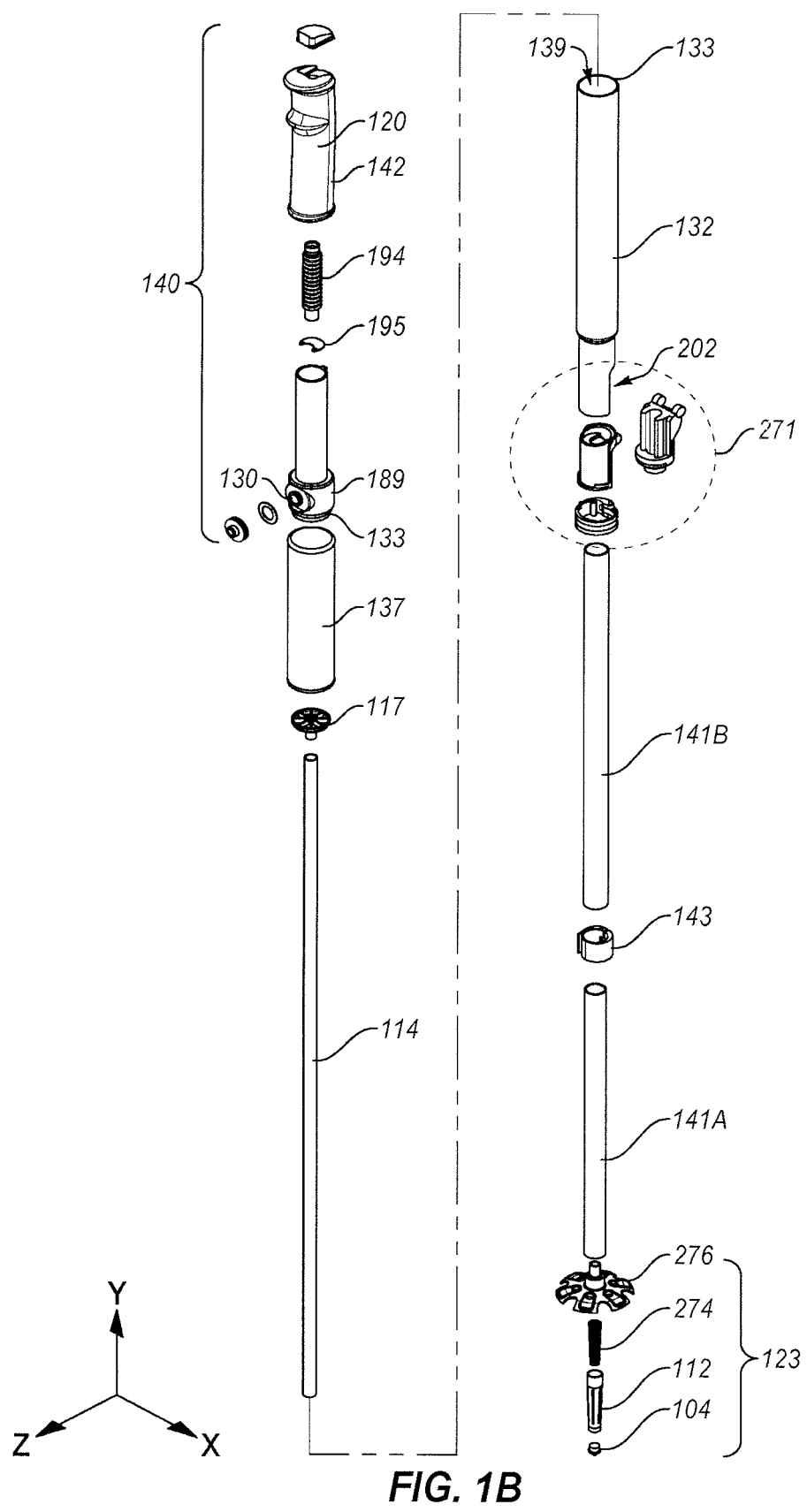
FIG. 1B is an exploded view of the walking stick of FIG. 1A.

Embodiments are described with reference to the appended Figures. In the Figures, features with like item numbers have similar structure and function unless specified otherwise. FIGS. 1A and 1B illustrate an example walking stick with integrated water filtration (hereinafter, "walking stick") 100. FIG. 1A depicts an external view of the walking stick 100. FIG. 1B depicts an exploded view of the walking stick 100. The walking stick 100 may be used to support or aid in support of a user during activities such as walking, hiking, trekking, backpacking, camping, etc. For instance, the user may grip a portion of the walking stick 100 such as a handle grip 120 during the activity. The walking stick 100 may enable transfer of a portion of the weight of the user to the walking stick 100, which may assist in stability of the user and/or may reduce stress on the legs and/or the back of the user.

Additionally, the walking stick 100 enables the user to obtain potable/drinkable water from a natural source such as a river or a stream and/or an untrustworthy source such as a fountain, a well, or a drinking fountain. For example, the user may place a portion of the walking stick 100 in the natural source or the untrustworthy source (collectively, a source or sources). The user may then operate a mechanism in the walking stick 100 to draw water from the source and force the water through a filter. As the water passes through the filter, contaminants or some portion thereof may be removed, which may make the water from the source suitable to drink or otherwise use (e.g., wash, cook, mix with other consumables, etc.).

The walking stick 100 of FIGS. 1A and 1B includes a rod assembly 102 and a water purification assembly 110. With reference to FIG. 1A, the water purification assembly 110 is integrated with and/or into the rod assembly 102. For instance, the general external structure of the rod assembly 102 incorporates the general external structure of the water purification assembly 110 to make a substantially cylindrical structure. In some embodiments, an outer diameter 212 of the water purification assembly 110 or portion thereof may be greater than one or more outer diameters 131 of the rod assembly 102. The outer diameter 212 may, however, be within about thirty-five percent of at least one of the diameter 131. Accordingly, the overall external structure and appearance of the walking stick 100 includes a series or set of substantially cylindrical portions with similar diameters. In some embodiments, the outer diameter 212 of the water purification assembly 110 or portion thereof may be substantially similar to or the same as at least one of the outer diameters 131 of the rod assembly 102.

Integration of the water purification assembly 110 with or into the rod assembly 102 may result in an improvement in a function of the walking stick 100 compared to walking sticks in which a water purification assembly is offset from the rod assembly 102. For instance, during use in the activity and between instances of obtaining water from the source, the user may use the walking stick 100 similar to how the user would use a walking stick without the water purification assembly 110. Additionally, the integration reduces an overall external profile of the walking stick 100 and may conceal the water purification assembly 110. Additionally still, a transition from use of the walking stick 100 as a walking stick (e.g., for support) to use as a water filter is minimized. For example, the user does not have to significantly reconfigure the walking stick 100 for use as a water filter.

The rod assembly 102 extends from a first end 104 to a second end 106. The second end 106 is opposite the first end 104. The first end 104 is located in the lower portion 251C (e.g., having a lower y-coordinate) of the walking stick 100. A longitudinal direction is represented in by an arrow 111. The longitudinal direction 111 may be substantially parallel to the y-axis in the arbitrarily-defined coordinate system of FIGS. 1A and 1B.

Between the first end 104 and the second end 106, a length 108 may be defined. The length 108 is defined along the longitudinal direction 111. The length 108 may depend on a particular application or activity for which the walking stick 100 is designed. For example, the walking stick 100 may be designed for children, adults, taller people, strenuous hiking, walking, etc. The length 108 may be different for each of these. For instance, for children the length 108 may be short (e.g., between about 24 inches and about 40 inches). Alternatively, the walking stick 100 may be designed for adults. In these embodiments, the length 108 may be between about 48 inches and about 59 inches in some embodiments. In the embodiment of FIGS. 1A and 1B, the length 108 may be adjustable. In these and other embodiments, the walking stick 100 may include one or more components or features that enable the length 108 to be adjusted. For example, the rod assembly 102 may include one or more rod portions 141A and 141B (generally, rod portion 141 or rod portions 141). The rod portions 141 may be selectively secured relative to one another. For instance, in FIGS. 1A and 1B, a first rod portion 141A may include a smaller diameter than a second rod portion 141B. The first rod portion 141A may accordingly be able to be translated into and within the second rod portion 141B and to be selectively retained within the second rod portion 141A.

The rod assembly 102 may also include one or more adjustment collars 143. The walking stick 100 of FIGS. 1A and 1B includes one adjustable collar 143 between the first rod portion 141A and the second rod portion 141B. In other embodiments, the rod assembly 102 may include two or more adjustable collars 143 positioned between rod portions 141.

The adjustment collar 143 is configured to secure at least one of the rod portions 141 relative to at least one other of the rod portions 141. The adjustment collar 143 may be loosened and tightened. For example, the adjustment collars 143 may include a lever that may be rotated relative to the rod portions 141 in a first direction to loosen the adjustment collars 143 and in a second direction to tighten the adjustment collars 143. Loosening the adjustment collar 143 enables translation of one of the rod portions 141 relative to at least one other of the rod portions 141. Additionally, tightening of the adjustment collar 143 may secure the at least one of the rod portions 141 relative to the at least one other of the rod portions 141. Accordingly, using the adjustment collar 143, the rod assembly 102 may be configurable in a collapsed arrangement and an elongated arrangement. In the collapsed arrangement, the rod portions 141 are translated relative to one another such that the length 108 of the rod assembly 102 is a shortest length. In the elongated arrangement, the rod portions 141 are translated relative to one another such that the length 108 of the rod assembly 102 is a greatest length.

The walking stick 100 defines one or more openings 112 at the first end 104 of the rod assembly 102. In the depicted embodiment, the opening 112 are defined in a rod tip 123 near the first end 104. In other embodiments, the openings 112 may be positioned at the first end 104. For instance, instead of a point or integrated into the point, the opening(s) 112 may be defined. The openings 112 may enable water to enter the walking stick 100 from the source.

In the embodiment of FIGS. 1A and 1B, the rod tip 123 may be fluidly coupled to a basket 276. The basket 276 may enable water drawn from the source to pass at an inlet tube 114. The inlet tube 114 (FIG. 1B) extends from the opening 112 to the water purification assembly 110. In other embodiments, the openings 112 may be defined above the basket 276 and/or may directly enter the inlet tube 114. Additionally or alternatively, in these and other embodiments, the basket 276 may be omitted and the inlet tube 114 may be directly fluidly coupled to the rod tip 123.

The inlet tube 114 is at least partially positioned within the rod assembly 102. In the depicted embodiment, the inlet tube 114 includes a tube, which may be comprised of a food-grade plastic or another suitable material. The inlet tube 114 is positioned within the rod portions 141 and may be configured to be flexible/bendable such that the walking stick 100 is configurable in the collapsed arrangement and the elongated arrangement without preventing water from flowing through the inlet tube 114. In other embodiments, the inlet tube 114 may include a portion of the rod portions 141. For instance, the inlet tube 114 may include a sanitary or a coated inner surface within the rod portions 141.

The inlet tube 114 is configured to enable transport of the water from the opening 112 to a filter inlet 202 (FIG. 1B) of the water purification assembly 110. Accordingly, the walking stick 100 includes an inlet volume 116 that is defined from the opening 112 to the water purification assembly 110. The inlet volume 116 fluidly couples the opening 112 to the water purification assembly 110.

In the depicted embodiment, the walking stick 100 may include a fluid spreader 117. The fluid spreader 117 is introduced into the inlet tube 114 and may be positioned at the filter inlet 202. The water drawn through the inlet tube 114 enters the fluid spreader 117 and is dispersed radially from the inlet tube 114. The fluid spreader 117 may enable the water to reach all portions of a filter device positioned in the water purification assembly 110.

To draw the water 201 into the walking stick 100, the first end 104 may be placed in a source such that the opening 112 located on the first end 104 is submerged in the water source. A pressure gradient may be imposed in the water purification assembly 110 and the inlet volume 116. The pressure gradient may act to draw the water from the source into the inlet volume 116 and to the water purification assembly 110.

The water purification assembly 110 of the walking stick 100 is configured to filter water. One or more structural features of the walking stick 100 assist in delivery of the water to the water purification assembly 110. In addition, one or more structural features of the walking stick 100 enable access to filtered water as it exits the water purification assembly 110.

The water purification assembly 110 includes a filter housing 132. The filter housing 132 defined a filter volume 139 into which a filter device (not shown) may be positioned. The filter inlet 202 is defined at a lower end (e.g. having a lower y-coordinate) of the filter housing 132. The water may enter the water purification assembly 110 through the filter inlet 202. The water passes through a filter device in the filter volume because a pressure gradient is imposed in the water purification assembly 110. As the water passes through the filter device, at least a portion of contaminates are removed from the water.

In some embodiments, the filter housing 132 and a passage block 189 may be a single integrated structure. In other embodiments, the filter housing 132 may be connected to the passage block 189 via a coupling 133 at an upper end of the filter housing 132. The coupling 133 may secure the passage block 189 to the filter housing 132. Disassembly of the coupling 133 enables access to the filter volume 139. Accordingly, the threaded coupling 133 may enable the user to change or replace a filter device or portions/components thereof. In some embodiments, the coupling 133 is a threaded coupling, a slide-lock, a clamping mechanism, or any other suitable coupling.

In some embodiments, the filter housing 132 may include a threaded coupling that secures a first portion of the filter housing 132 to a second portion of the filter housing 132. The threaded coupling may be positioned at some point between the filter inlet 202 and the passage block 189.

The walking stick 100 includes an outlet 130. The outlet 130 is defined in the passage block 189. The outlet 130 includes an exposed end that is externally accessible. For example, a user may access filtered water from the outlet 130. The outlet 130 is fluidly coupled to the filter volume 139 defined by the filter housing 132. For example, the filtered water that exits the walking stick 100 via the outlet 130 after it has passed through a filter device positioned in the filter volume 139.

The pressure gradient imposed in the inlet volume 116 and the water purification assembly 110 forces the water drawn from the source through the filter device positioned in the filter volume 139. After the water passes through the filter device, it is considered filtered water. The filtered water is then pushed out of the walking stick 100 via the outlet 130. The user may collect the filtered water at the outlet 130.

In the depicted embodiment, the outlet 130 is positioned at the top of the water purification assembly 110 in the passage block 189. In some embodiments, the outlet 130 may be positioned at or near the second end 106 of the rod assembly 102. Additionally, the water purification assembly 110 may be positioned in the first rod portion 141A or in another position along the length 108 of the rod assembly 102. Additionally or alternatively, the outlet 130 may be positioned at the bottom (e.g., having a lower y-coordinate) of the water purification assembly 110, the walking stick 100 may include multiple outlets 130, etc.

The walking stick 100 may include a filter housing sleeve 137. The filter housing sleeve 137 may be positioned over the filter housing 132 or a portion thereof. The filter housing sleeve 137 may provide insulation and/or structural support to the filter housing 132. Additionally or alternatively, the filter housing sleeve 137 may be configured as a handle that the user may grasp during use of the walking stick 100.

The pressure gradient imposed in the inlet volume 116 may be caused by a pump. In the depicted embodiment, the pump is a manual pump 140. Some additional details of the manual pump 140 are provided with reference to FIGS. 2A-2C. In other embodiments, the pump may include an electrical pump. The electrical pump may be positioned within the handle portion 142 of the walking stick 100 or another portion of the walking stick 100. The electrical pump may impose the pressure gradient in the inlet volume 116 and filter volume 139. The pressure gradient may draw water from the source, through then inlet volume 116, through the filter device, and out the outlet 130.

In the embodiment of FIGS. 1A and 1B, the filter device is removable. Some examples of the filter device include a hollow fiber, a carbon filter, a charcoal filter, a silica depth, a ceramic filter, a fiberglass filter, or another suitable media. In some embodiments, the filter device includes a pore-size of less than 0.4 microns (e.g., 0.2 or 0.1 microns). The water purification assembly 110 may include various sizes and/or capacities. For example, the water purification assembly 110 may be configured to filter large volumes (e.g., multiple gallons) of water, which may provide potable water for multiple people. Alternatively, the water purification assembly 110 may be configured to filter a personal amount of water (e.g., about a gallon). Additionally, in some embodiments, an ultraviolet (UV) light source may be incorporated in the walking stick 100. Water in the walking stick 100 may be exposed to the UV light of the UV light source, which may treat the water.

Additionally, the walking stick 100 may include a hinge mechanism 271. The hinge mechanism 271 may be configured to enable the walking stick 100 to be folded. For example, in the arrangement of FIG. 1A, an upper portion of the walking stick 100 above the hinge mechanism 271 is in-line with a lower portion of the walking stick 100 below the hinge mechanism 271. In a folded arrangement that is enabled by the hinge mechanism 271, the upper portion is positioned next to or at some angle relative to the lower portion. Some additional details of the hinge mechanism 271 are provided with reference to FIG. 2B. Some embodiments may omit the hinge mechanism 271.

The rod assembly 102 or components (e.g., 141, 123, etc.) may be comprised of aluminum, copper, steel, plastic, carbon fiber, wood, or any other suitable material. In the embodiment of FIGS. 1A and 1B, the rod assembly 102 is substantially straight. For example, between the first end 104 and the second end 106, there are no angles or bends. In some embodiments, the rod assembly 102 includes at least one angle or at least one bend. For example, the handle grip 120 may curve such that a portion thereof is parallel or substantially parallel to the x-axis. Additionally, some embodiments of the walking stick 100 may include multiple bend and angles, which may help with ergonomics and functionality.

The embodiment of FIGS. 1A and 1B illustrate the walking stick 100 with the water purification assembly 110. In some embodiments, the walking stick 100 may be manufactured without various components such as the pump (e.g., 140 of FIG. 1A), the water purification assembly 110, the inlet tube 114, etc. The walking stick 100 without the components may be paired with the walking stick 100 with the water purification assembly 110. A user may then have a set of walking sticks, one for each hand. In the walking stick 100 without the components, volumes previously used for components may be storage volumes.

Figure 2A:
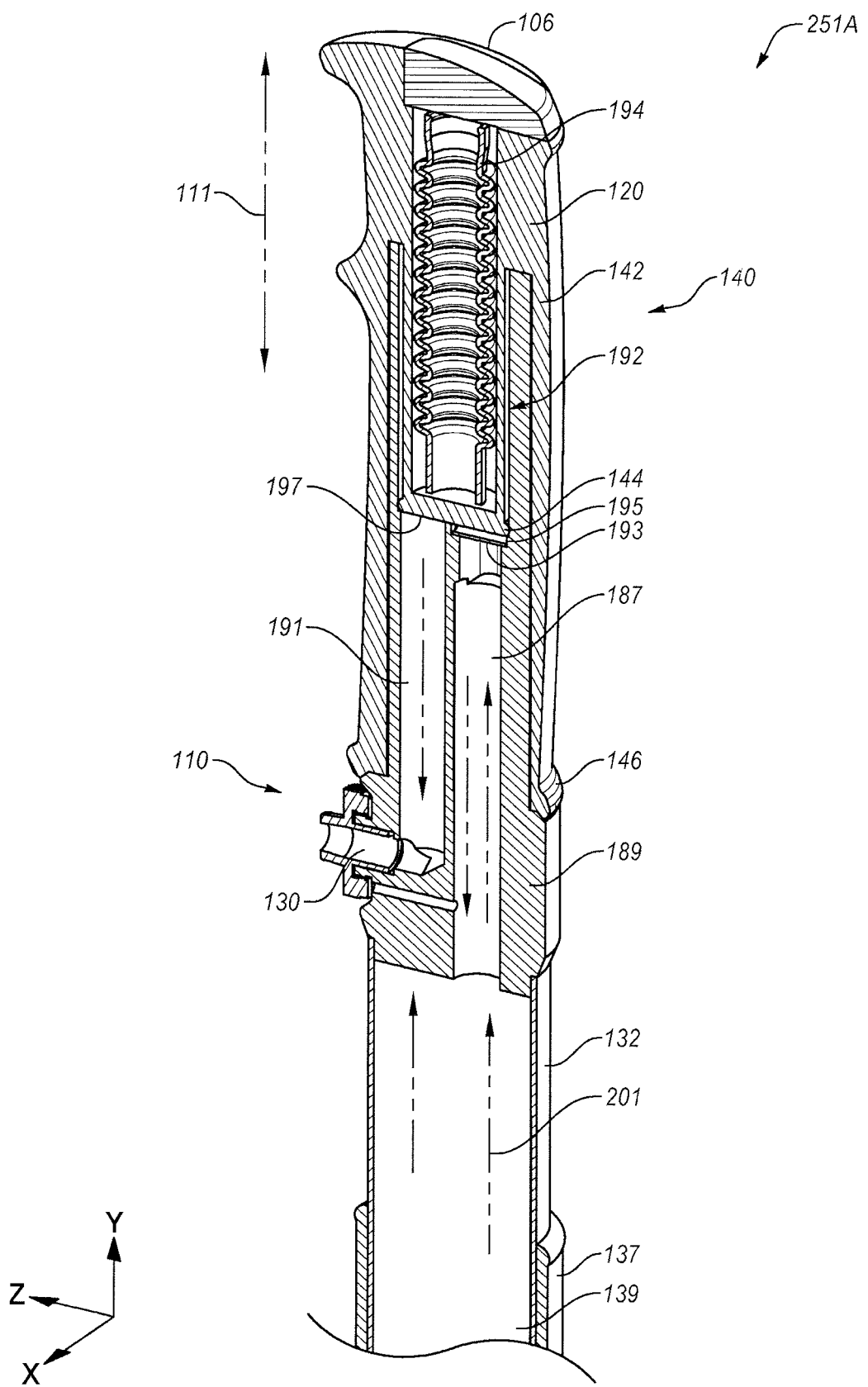
FIG. 2A illustrates a sectional view of a first portion of the walking stick of FIG. 1A.
Figure 2B:
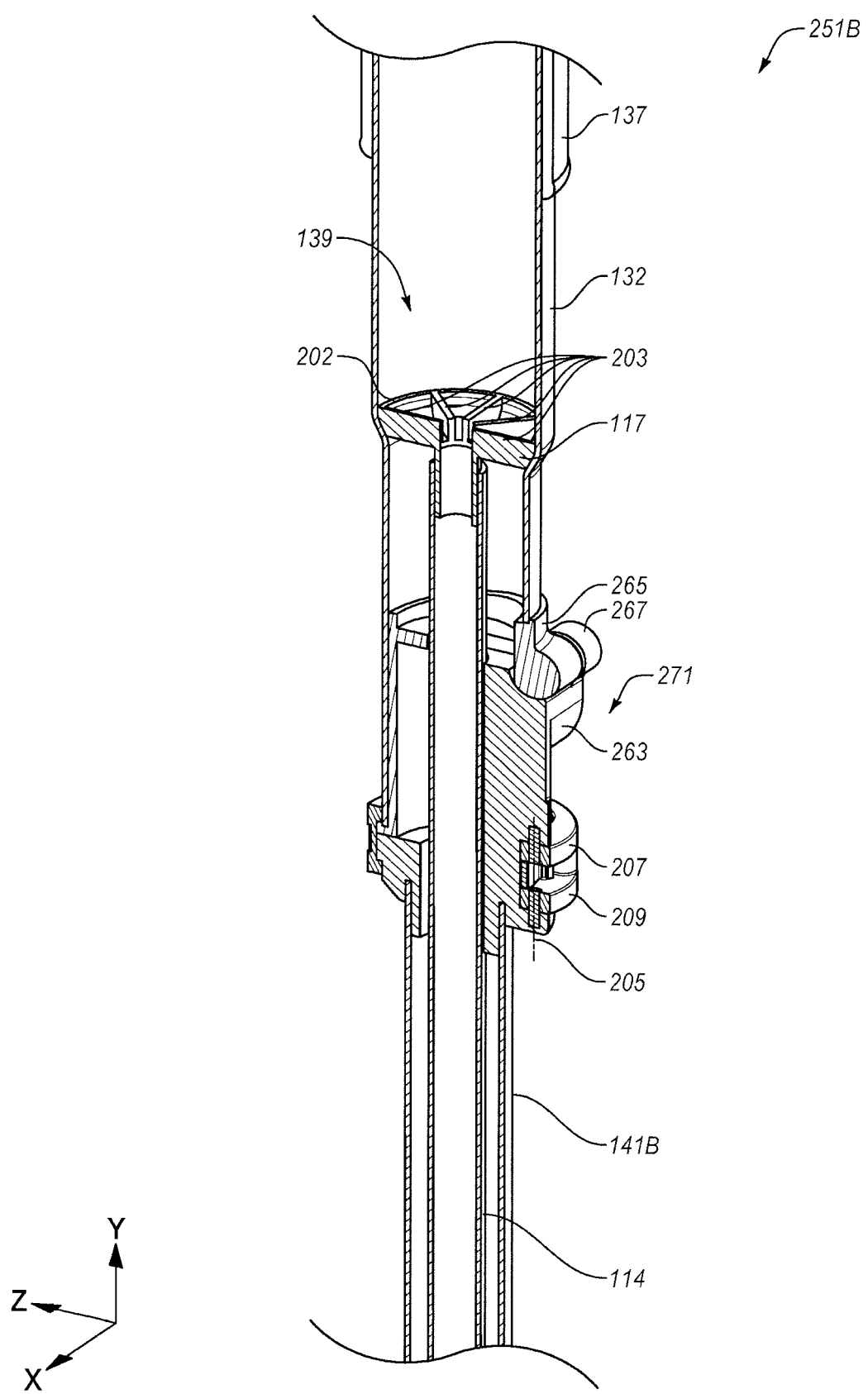
FIG. 2B illustrates a sectional view of a second portion of the walking stick of FIG. 1A.
Figure 2C:
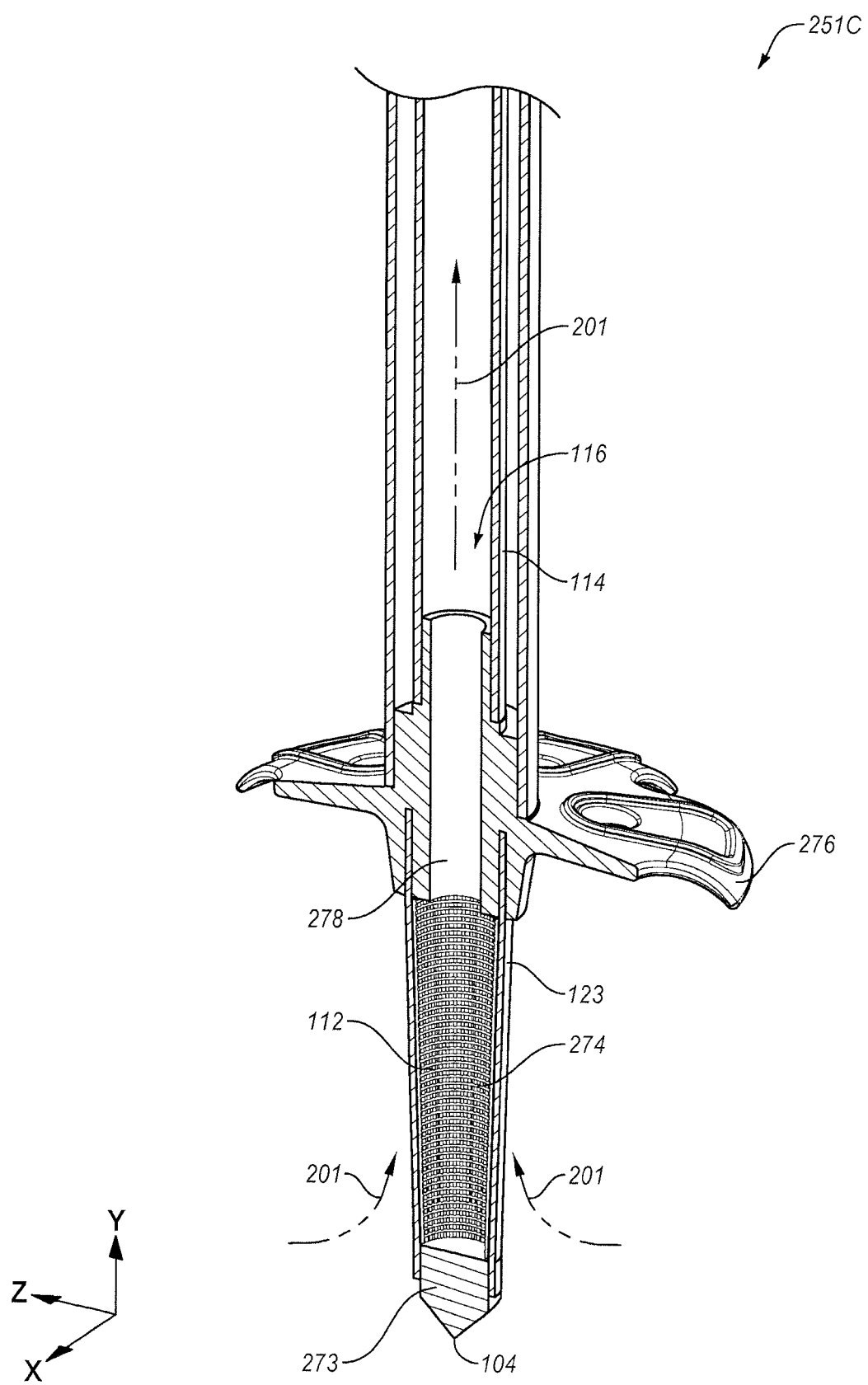
FIG. 2C illustrates a sectional view of a third portion of the walking stick of FIG. 1A.

FIGS. 2A-2C illustrate sectional views of the walking stick 100 of FIGS. 1A and 1B. FIG. 2A depicts a sectional view of an upper portion 251A of the walking stick 100. FIG. 2B depicts a sectional view of a middle portion 251B of the walking stick 100. FIG. 2C depicts a sectional view of a lower portion 251C of the walking stick 100. With reference to FIGS. 1A and 2A-2C, the upper portion 251A includes a first portion of the walking stick 100 that includes the handle grip 120 and the manual pump 140. The lower portion 251C includes a second portion that includes the first end 104. The middle portion 251B includes a third portion between the upper portion 251A and the lower portion 251C.

Referring to FIGS. 2A-2C, to draw the water 201 through the water purification assembly 110 a pressure gradient is imposed on the water purification assembly 110 and the inlet volume 116. In the embodiment of FIGS. 2A-2C, the pressure gradient may be imposed by the manual pump 140. As used in the present disclosure, the term manual indicates that the user provides the motive force that actuates the mechanism or mechanisms of a device. For instance, in the manual pump 140, the user actuates the manual pump 140 by moving a portion of the rod assembly 102 that includes the handle grip 120 in substantially the longitudinal direction 111.

The manual pump 140 is configured to impose the pressure gradient in the water purification assembly 110 and to draw the water 201 into the inlet volume 116. The manual pump 140 may include a handle portion 142 at the second end 106 that includes the handle grip 120 on an exterior portion thereof.

The handle portion 142 includes a cylindrical shell that extends over a top portion of the water purification assembly 110. A collar 146 is included at a bottom of the handle portion 142. In an inactive configuration (as depicted in FIG. 2A), the handle portion 142 is connected to the passage block 189 that is positioned at a top end of the filter housing 132. To retain the handle portion 142 relative to the rod assembly 102, the collar 146 may be threaded or otherwise engaged to the passage block 189. Thus, the collar 146 may be configured to selectively retain the handle portion 142 relative to the rod assembly 102. When the walking stick 100 is in the inactive configuration, the manual pump 140 is not producing a pressure or pressure gradient in the water purification assembly 110 or inlet volume 116.

In an active configuration, the collar 146 is disconnected from the passage block 189. Disconnection of the collar 146 from the passage block 189 may be performed through rotation of the handle portion 142 relative to the passage block 189 or application of a longitudinal force on the handle portion 142, for instance. Additionally, the disconnection enables translation of the handle portion 142 in the longitudinal direction 111 (e.g., y-direction and negative y-direction) relative to remaining portions of the rod assembly 102. The passage block 189 defines a pump inlet tube 187 and a pump outlet tube 191. The pump inlet tube 187 extends from the filter volume 139 defined by the filter housing 132 to an inlet tube end 193. In some embodiments, a butterfly valve 195 may be positioned at the inlet tube end 193. The butterfly valve 195 (also visible in FIG. 1B) may enable water 201 to pass one direction through the butterfly valve 195 and prevent the water 201 from passing in an opposite direction through the butterfly valve 195. The pump outlet tube 191 may extend from an outlet tube end 197 to the outlet 130. The outlet 130 is externally accessible and fluidly coupled to the filter volume 139 defined by the filter housing 132 by the pump outlet tube 191 and the pump inlet tube 187.

The handle portion 142 is physically connected to a plunger 144. The plunger 144 is positioned in a translation volume 192 defined by the passage block 189. The translation volume 192 is fluidly coupled to the pump inlet tube 187 and the pump outlet tube 191 via the inlet tube end 193 and the outlet tube end 197, respectively. Longitudinal motion of the plunger 144 in the translation volume 192 in the positive y-direction draws the water 201 into the pump inlet tube 187 from the filter volume 139. The water 201 passes through the butterfly valve 195 into the translation volume 192. The motion in the positive y-direction further draws the water 201 into the inlet volume 116 from the source. Motion of the plunger 144 in the negative y-direction pushes the water 201 into the pump outlet tube 191 and out the outlet 130.

A bellows 194 may be included within a compartment formed the handle portion 142. The bellows 194 may be selectively attached to the outlet 130. The bellows 194 may enable the water 201 output from the outlet 130 to be distributed (e.g., directed to a bottle or placed in a mouth of the user.).

In FIG. 2B, a sectional view of the middle portion 251B of the walking stick 100 is depicted. The middle portion 251B includes the hinge mechanism 271. The hinge mechanism 271 may enable disassembly or folding of the walking stick 100. For example, the hinge mechanism 271 may enable the second rod portions 141B to become disengaged from the filter housing 132. With the second rod portions 141B disengaged from the filter housing 132, the walking stick 100 may be positioned in a folded arrangement. Additionally, in some embodiments, one or more components (e.g., 114, 117, etc.) may be removed from the rod assembly 102. The components may be cleaned, replaced, etc. Additionally, in some embodiments, with the rod portion 141B disengaged from the filter housing 132, a filter device placed in the filter volume 139 may be accessed, replaced and/or one or more portions of the water purification assembly 110 may be accessed.

Figure 4:
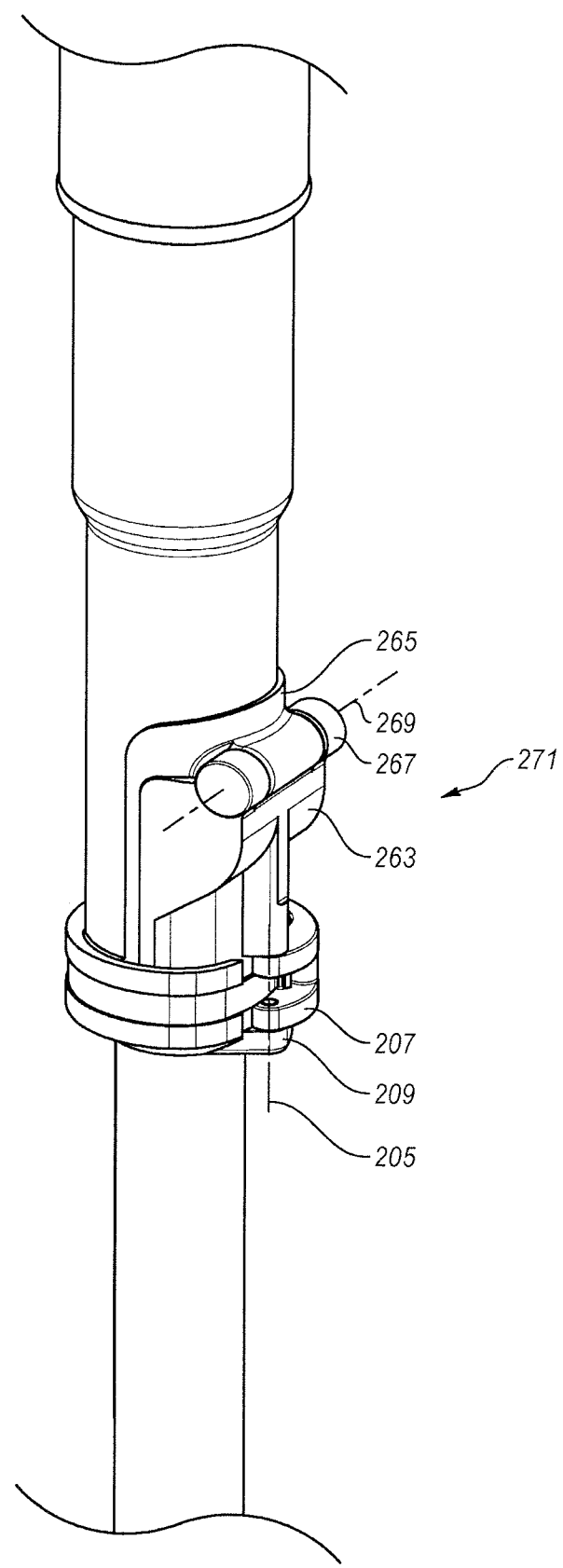
FIG. 4 illustrates a detailed view of an example hinge mechanism that may be implemented in the walking stick of FIG. 1A, all arranged in accordance with at least one embodiment described herein.

Referring to FIG. 4, an exterior view of the hinge mechanism 271 is depicted. Referring to FIGS. 2B and 4, the hinge mechanism 271 includes a first hinge portion 263. The first hinge portion 263 is mechanically coupled to the second rod portion 141B. The hinge mechanism 271 also includes a second hinge portion 265. The second hinge portion 265 is mechanically coupled to the filter housing 132. The hinge mechanism 271 includes a rotational element 267 that enables rotation of the first hinge portion 263 relative to the second hinge portion 265 about an axis 269.

The hinge mechanism 271 may also include a collar 209. The collar 209 may include a lever 207. The lever 207 may be rotated relative to the collar 209 to lock the first hinge portion 263 relative to the second hinge portion 265. For instance, in the positioned depicted in FIGS. 2B and 4, the lever 207 is positioned in a lock position, which locks the first hinge portion 263 relative to the second hinge portion 265. The lever 207 may be rotated about axis 205 to unlock the first hinge portion 263 relative to second hinge portion 265.

Referring back to FIG. 2B, the middle portion 251B may include fluid spreader 117. The fluid spreader 117 is engaged at an end of the inlet tube 114 and positioned in the filter inlet 202. The fluid spreader 117 includes a set of protrusions 203 that extend radially from a central opening. The set of protrusions enable the water to radially disperse prior to entry into the filter volume 139. Additionally, when the water 201 drains from the walking stick 100 (as described below), the fluid spreader 117 may collect the water 201 and directed it to the inlet tube 114.

Referring to FIG. 2C, the lower portion 251C of the rod assembly 102 of FIG. 1 is depicted. The lower portion 251C includes the rod tip 123. For example, the rod tip 123 is located at the first end 104. The openings 112 may be defined in the rod tip 123 or a component thereof. In the depicted embodiment, the openings 112 may include rectangular or substantially rectangular openings defined longitudinally along the rod tip 123. The rod tip 123 may be comprised of a metal/carbide or rubber and any other suitable materials and may include a point 273.

In addition, the lower portion 251C of the rod assembly 102 may include an initial filter system 274 (also visible in FIG. 1B). The initial filter system 274 is positioned between the openings 112 and the inlet volume 116. The initial filter system 274 is configured to remove at least a second portion of the contaminants from the water 201 as the water 201 moves from the openings 112 up the inlet tube 114. In some embodiments, the second portion of the contaminants includes particulates that are greater in size that the portion of the contaminants that are removed from the water purification assembly 110 described elsewhere in the present disclosure. The initial filter system 274 may include a course filter (e.g., gravel, sand, charcoal, etc.).

The rod assembly 102 includes the basket 276. The basket 276 may extend radially from the rod assembly 102. The basket 276 may be mechanically coupled to the external structure of the rod assembly 102 as well as the inlet tube 114. The basket 276 may define a passage 278 through which the water 201 enters the inlet tube 114.

In some embodiments, the initial filter system 274 and the openings 112 may be positioned at a different location on the rod assembly 102. For example, the openings 112 and/or the initial filter system 274 may be positioned above the basket 276. Placement of the openings 112 may be based at least partially on a balance of the walking stick. 100 about a center portion of the walking stick 100. For example, the initial filter system 274 may be located about 1.5 inches or about 3.8 centimeter from the first end 104.

Figure 3:
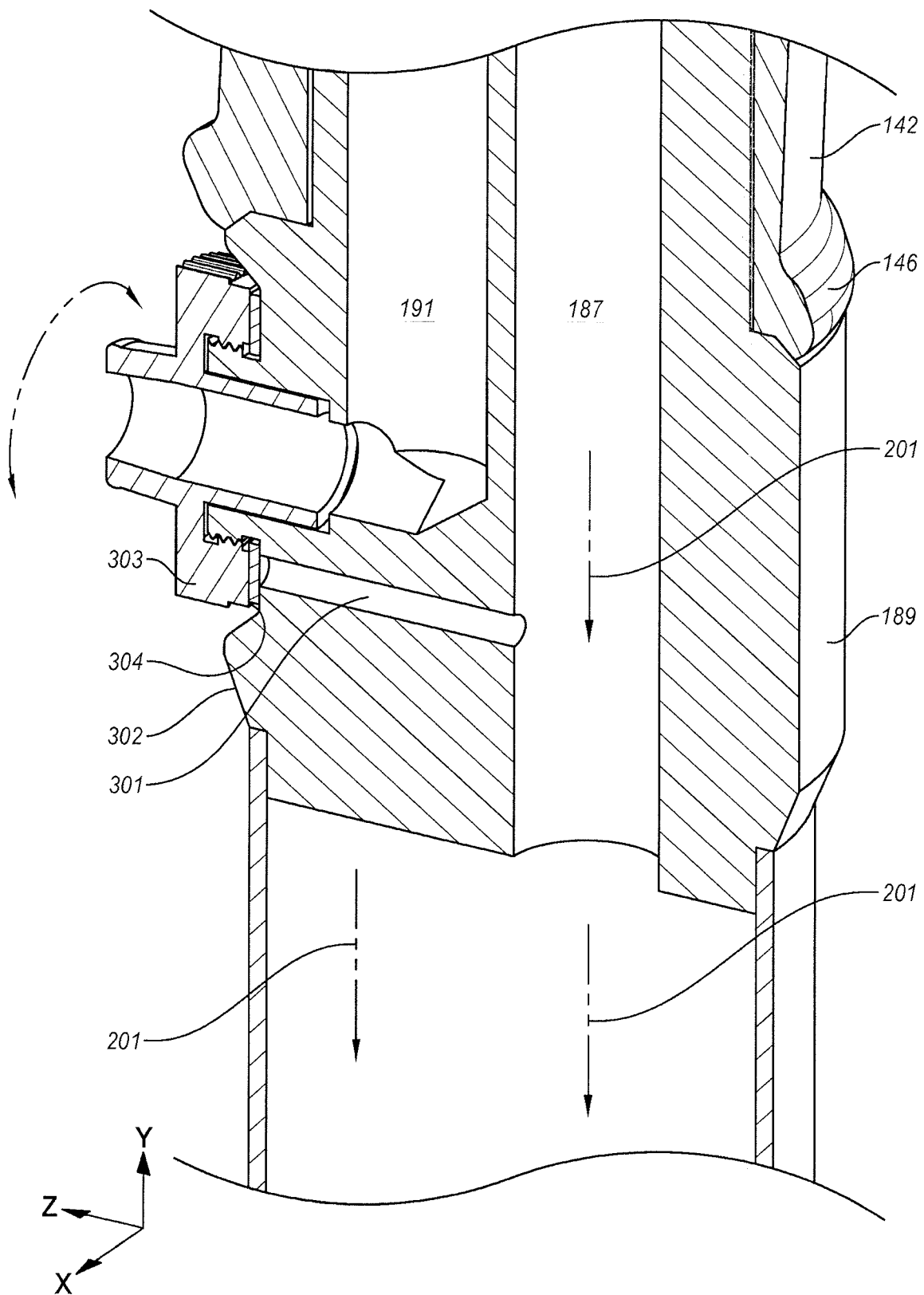
FIG. 3 illustrates an example passage block that may be implemented in the walking stick of FIG. 1A.

FIG. 3 depicts a detailed view of an embodiment of the passage block 189 that may be implemented in the walking stick 100 of FIGS. 1A and 1B. The passage block 189 defines the outlet 130 that extends from the pump outlet tube 191 to a surrounding environment. In addition, the passage block 189 may define a backflow passage 301. The backflow passage 301 extends from the pump inlet tube 187 to an outer surface 302 of the passage block 189. The outlet 130 may extend from the outer surface 302. Around at least a portion of the outlet 130, a backflow ring 303 may be place on the portion of the outlet 130 that extends from the outer surface 302. The backflow ring 303 includes a rear surface 304. The rear surface 304 is configured to seal or substantially seal the backflow passage 301 at the outer surface 302. For example, when the user is operating the manual pump 140 of FIG. 2A, the backflow ring 303 may be positioned to seal the backflow passage 301, which may enable or maintain pressure or the pressure gradient to form in the pump inlet tube 187.

The backflow ring 303 may define an opening or a cut-away on the rear surface 304. When the opening or the cut-away is positioned over the backflow passage 301, the backflow passage 301 is exposed or vented to ambient pressure. The ambient pressure may enable the water 201 to drain from the pump inlet tube 187, the filter volume 139, and the inlet volume 116 described in at least FIG. 1B. Accordingly, following pumping and filtering the water 201 during which the backflow passage 301 is sealed, the user may rotate the backflow ring 303 to align the cut-away or opening with the backflow passage 301. Any of the water 201 remaining in the pump inlet tube 187 may drain from the walking stick 100. After the water 201 drains, the user may rotate the backflow ring 303 such that the rear surface 304 seals the backflow passage 301. In some embodiments, a sealing ring, which may be made of a plastic, may be positioned between the backflow passage 301 and the rear surface 304. In some embodiments, the backflow passage 301 may be connected to the pump inlet tube 187 at another location and/or may include another valve such as a manually actuated vent valve.

Although each of the Figures and embodiments are described individually, the features described with reference to one of the Figures or embodiments may be implemented in one or more other embodiments.

The present disclosure is not to be limited in terms of the particular embodiments described herein, which are intended as illustrations of various aspects. Many modifications and variations can be made without departing from its spirit and scope. Functionally equivalent methods and apparatuses within the scope of the disclosure, in addition to those enumerated herein, are possible from the foregoing descriptions. Such modifications and variations are intended to fall within the scope of this disclosure. It is also to be understood that the terminology used herein is for the purpose of describing particular embodiments only, and is not intended to be limiting.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations. In addition, even if a specific number of an introduced claim recitation is explicitly recited, those skilled in the art will recognize that such recitation should be interpreted to mean at least the recited number (e.g., the bare recitation of "two recitations," without other modifiers, means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

As will be understood by one skilled in the art, for any and all purposes, such as in terms of providing a written description, all ranges disclosed herein also encompass any and all possible sub ranges and combinations of sub ranges thereof. Any listed range can be easily recognized as sufficiently describing and enabling the same range being broken down into at least equal halves, thirds, quarters, fifths, tenths, etc. As a non-limiting example, each range discussed herein can be readily broken down into a lower third, middle third and upper third, etc. As will also be understood by one skilled in the art all language such as "up to," "at least," and the like include the number recited and refer to ranges which can be subsequently broken down into sub ranges as discussed above. Finally, as will be understood by one skilled in the art, a range includes each individual member. Thus, for example, a group having 1-3 cells refers to groups having 1, 2, or 3 cells. Similarly, a group having 1-5 cells refers to groups having 1, 2, 3, 4, or 5 cells, and so forth.

From the foregoing, various embodiments of the present disclosure have been described herein for purposes of illustration, and various modifications may be made without departing from the scope and spirit of the present disclosure. Accordingly, the various embodiments disclosed herein are not intended to be limiting.

All examples and conditional language recited herein are intended for pedagogical objects to aid the reader in understanding the invention and the concepts contributed by the inventor to furthering the art, and are to be construed as being without limitation to such specifically recited examples and conditions. Although embodiments of the present invention have been described in detail, it should be understood that the various changes, substitutions, and alterations could be made hereto without departing from the spirit and scope of the invention.

What is claimed is:

1. A walking stick, comprising:
a rod assembly that extends from a first end to a second end that is opposite the first end along a longitudinal direction of the rod assembly, wherein the rod assembly includes at least one rod portion;
a water purification assembly that is integrated with the rod assembly, and
a manual pump that is configured to impose a pressure gradient in the water purification assembly, wherein:
the manual pump includes a plunger that is physically coupled to a handle portion at the second end of the rod assembly,
a motion of the plunger relative to the water purification assembly draws water into an inlet tube that is positioned in the rod portion and through the water purification assembly, and
the motion of the plunger results from translation of the handle portion in substantially the longitudinal direction of the rod assembly wherein the water purification assembly includes a filter inlet and a filter housing; the filter inlet is coupled to the inlet tube; and the filter housing defines a filter volume configured to receive a filter device that is configured to remove at least a portion of contaminates from said drawn water through imposition of the pressure gradient in the inlet tube and the filter volume.

2. The walking stick of claim 1, further comprising a passage block that is positioned at one end of the filter housing, wherein:
the passage block defines a pump inlet tube, a pump outlet tube, and a translation volume,
the pump inlet tube extends from the filter volume to the translation volume, and
the pump outlet tube extends from the translation volume to an outlet.

3. The walking stick of claim 2, wherein:
the handle portion includes a collar that is configured to selectively attach to a portion of the passage block to place the manual pump in an active configuration and an inactive configuration;
in the active configuration the handle portion is disconnected from the passage block and capable of translation relative to the passage block; and
in the inactive position, the handle portion is connected to the passage block.

4. The walking stick of claim 3, further comprising a bellows that is included within a compartment in the handle portion.

5. The walking stick of claim 2, further comprising a butterfly valve that is positioned at the inlet tube end between the pump inlet tube and the translation volume, wherein the butterfly valve is configured to enable the water to pass from the pump inlet tube to the translation volume and to prevent the water from passing from the translation volume to the pump inlet tube.

6. The walking stick of claim 2, wherein the passage block defines a backflow passage that extends from the pump inlet tube to an external surface of the passage block.

7. The walking stick of claim 6, further comprising a backflow ring that is configured to selectively seal the backflow passage.

8. The walking stick of claim 7, wherein the backflow ring is positioned on a portion of the outlet that extends from the external surface of the passage block.

9. The walking stick of claim 1, wherein:
the rod assembly defines one or more openings;
the inlet tube and said filter volume are fluidly coupled to said one or more openings; and
the pressure gradient imposed by the manual pump draws the water in through the openings.

10. The walking stick of claim 9, further comprising a rod tip that is located at the first end, wherein the one or more openings are defined in the rod tip.

11. The walking stick of claim 9, further comprising a rod tip and a basket, wherein said one or more openings are defined between the basket and the water purification assembly.

12. The walking stick of claim 1, further comprising an initial filter system that is positioned between said one or more openings and the inlet tube, wherein the initial filter system is configured to remove at least a second portion of contaminants from the water that include particulates that are greater in size that the portion of the contaminants that are removed from the water purification assembly.

13. The walking stick of claim 1, further comprising a fluid spreader that is introduced into the inlet tube and positioned at said filter inlet, wherein the fluid spreader is configured to radially disperse the water into said filter volume.

14. The walking stick of claim 1, wherein the rod assembly includes an upper portion that includes the manual pump, a lower portion that includes the first end, and a middle portion between the upper portion and the lower portion that includes at least a portion of the water purification assembly.

15. The walking stick of claim 1, wherein a length of the rod assembly from the first end to the second end is between about 48 inches and about 59 inches.

16. The walking stick of claim 1, wherein:
the rod assembly includes two or more rod portions that are selectively secured relative to one another;
the rod assembly includes an adjustment collar configured to secure one of said two or more the rod portions relative to the other rod portion;
loosening of the adjustment collar enables translation of one the rod portions relative to the other rod portion and tightening of the adjustment collar secures the one the rod portions relative to the other rod portion; and
the rod assembly is configurable in a collapsed arrangement in which the rod portions are translated relative to one another such that the length of the rod assembly is a shortest length.

17. The walking stick of claim 1, wherein an outer diameter of the water purification assembly is within about thirty-five percent of an outer diameter of said at least one rod portion.

18. The walking stick of claim 1, wherein the rod assembly is comprised of aluminum, copper, steel, plastic, carbon fiber, or wood.

* * * * *